(12) United States Patent
Betawar et al.

(10) Patent No.: US 7,559,001 B2
(45) Date of Patent: Jul. 7, 2009

(54) METHOD AND APPARATUS FOR EXECUTING COMMANDS AND GENERATION OF AUTOMATION SCRIPTS AND TEST CASES

(75) Inventors: Manoj Betawar, Fremont, CA (US);
Dinesh Goradia, Fremont, CA (US);
Purnendu Narayan, Milpitas, CA (US)

(73) Assignee: Sapphire Infotech Inc., Fremont, CA (US)

( * ) Notice: Subject to any disclaimer, the term of this patent is extended or adjusted under 35 U.S.C. 154(b) by 317 days.

(21) Appl. No.: 11/423,974

(22) Filed: Jun. 14, 2006

(65) Prior Publication Data
US 2008/0010553 A1    Jan. 10, 2008

(51) Int. Cl.
*G06F 11/00* (2006.01)

(52) U.S. Cl. .................. 714/738; 714/25; 714/37; 714/38; 714/715; 714/742; 702/108; 375/224; 709/228; 717/124

(58) Field of Classification Search .............. None
See application file for complete search history.

(56) References Cited

U.S. PATENT DOCUMENTS

| | | | | |
|---|---|---|---|---|
| 6,002,868 A * | 12/1999 | Jenkins et al. | | 717/105 |
| 6,463,552 B1 * | 10/2002 | Jibbe | | 714/33 |
| 6,654,911 B1 * | 11/2003 | Miles | | 714/38 |
| 7,010,782 B2 * | 3/2006 | Narayan et al. | | 717/124 |
| 7,117,411 B2 * | 10/2006 | McNeely et al. | | 714/724 |
| 7,158,907 B1 * | 1/2007 | Soldo | | 702/108 |
| 2003/0208616 A1 * | 11/2003 | Laing et al. | | 709/236 |
| 2004/0073890 A1 * | 4/2004 | Johnson et al. | | 717/124 |
| 2006/0271322 A1 * | 11/2006 | Haggerty | | 702/108 |
| 2007/0005281 A1 * | 1/2007 | Haggerty | | 702/108 |

OTHER PUBLICATIONS

U.S. Appl. No. 11/368,916, Bhaskar Bhaumik, Dinesh Goradia et.
U.S. Appl. No. 11/277,614, Manoj Betawar, Dinesh Goradia.

* cited by examiner

*Primary Examiner*—John P Trimmings
(74) *Attorney, Agent, or Firm*—Oblon, Spivak, McClelland, Maier & Neustadt, P.C.

(57) ABSTRACT

A command execution terminal includes an interactive graphical-user-interface (GUI) for sending commands to devices under test and to capture and display the command responses and maintaining a list of executed commands. The command execution terminal also provides functionality to create reusable device libraries of commands for a given device under test and to automate test case creation for device testing.

19 Claims, 8 Drawing Sheets

Figure 1 - (Prior Art)

METHOD AND APPARATUS FOR EXECUTING COMMANDS AND GENERATION OF AUTOMATION SCRIPTS AND TEST CASES

BACKGROUND OF INVENTION

1. Field of the Invention

This invention relates generally to the field of testing, provisioning and management of a network system, device or a solution. More particularly, the invention relates to the generation of test automation scripts and device libraries from a set of commands selected by the user and the association of these sets of commands with result templates and device characteristics, so that the sequence can be reused and associated with a test case and a class of device.

2. Background and Description of the Related Art

Numerous products are available on the market today that can provide testing capabilities. These are, however, limited to single vendor solutions. Also, there is no provision to provide for a unified user interface for similar products from multiple vendors.

The sequence of events in creating a test case from the interaction with a device is shown in FIG. 1. In creating a test or communication sequence, a user would select a device 101, then select a command from the known set either from knowledge or the documentation accompanying the device 102 and send the commands to the device with appropriate parameters 103. Each response is then compared against some known or assumed response format 104. Then another command can be entered if need be 105, until the last command is entered. At that point the list of commands to be generated can be manually created or saved if recorded and edited 107, then referenced by a test case.

In the available products you may be able to record the sequence, but not relate it to the known set of commands for that device or a specified result template or equivalent for the response.

What is desired is an apparatus, which provides a command execution framework and maintains command history persistent and visually displayed. Also, the apparatus either takes advantage of available scripts and device libraries to generate scripts or create device libraries. scripts, and result templates which can then be used to create test cases.

SUMMARY

In one embodiment, a method for creating a test case for a device under test (DUT) through a command terminal is disclosed. The method includes selecting the DUT in the command terminal. This selecting includes retrieving connection parameters for the DUT. The method further includes connecting to the DUT using the connection parameters and enabling input of a text string in the command terminal, the text string includes a command. The text string is parsed to identify the command and the command is stored in a history buffer. The command is then displayed in the command history panel of the command terminal. The command history panel displays the content of history buffer. The test string is sent to the DUT for execution. The command is stored in a data file.

BRIEF DESCRIPTION OF THE DRAWINGS

A better understanding of the present invention can be obtained from the following detailed description in conjunction with the following drawings, in which.

The figures are provided in order to provide a thorough understanding of the present invention. The figures should not be construed as limiting the breadth of the invention in any manner.

DETAILED DESCRIPTION

In this invention, one of the goals is to provide a test designer, an apparatus for defining test cases, and device libraries.

The term device library describes a set of device parameters necessary to connect and communicate with the device. It is described in detail in applicants' pending patent application title "METHOD AND APPARATUS FOR AUTOMATIC GENERATION OF SYSTEM TEST LIBRARIES", Ser. No. 11/368,916 filed on Mar. 6, 2006. One embodiment of this would be a data structure which stores the address, protocol, parsing methodology and prompts associated with a particular device. The prompts associated with a device are the strings which tell the program receiving a response from the device that the response is complete.

The term response template describes an apparatus which is essentially a pattern matching tool that is used to extract variable values from device responses. It is described in detail in applicants' pending patent application title "METHOD AND APPARATUS FOR INTERACTIVE GENERATION OF DEVICE RESPONSE TEMPLATES AND ANALYSIS", Ser. No. 11/277,614 filed on Mar. 27, 2006.

The term device under test (DUT) describes either a single device of a group of devices coupled together.

A graphical user interface (GUI) is provided for entering and execution of commands, for troubleshooting devices, and to create test cases and device libraries.

Graphical User Interface for Command Execution Terminal

Figure 3:
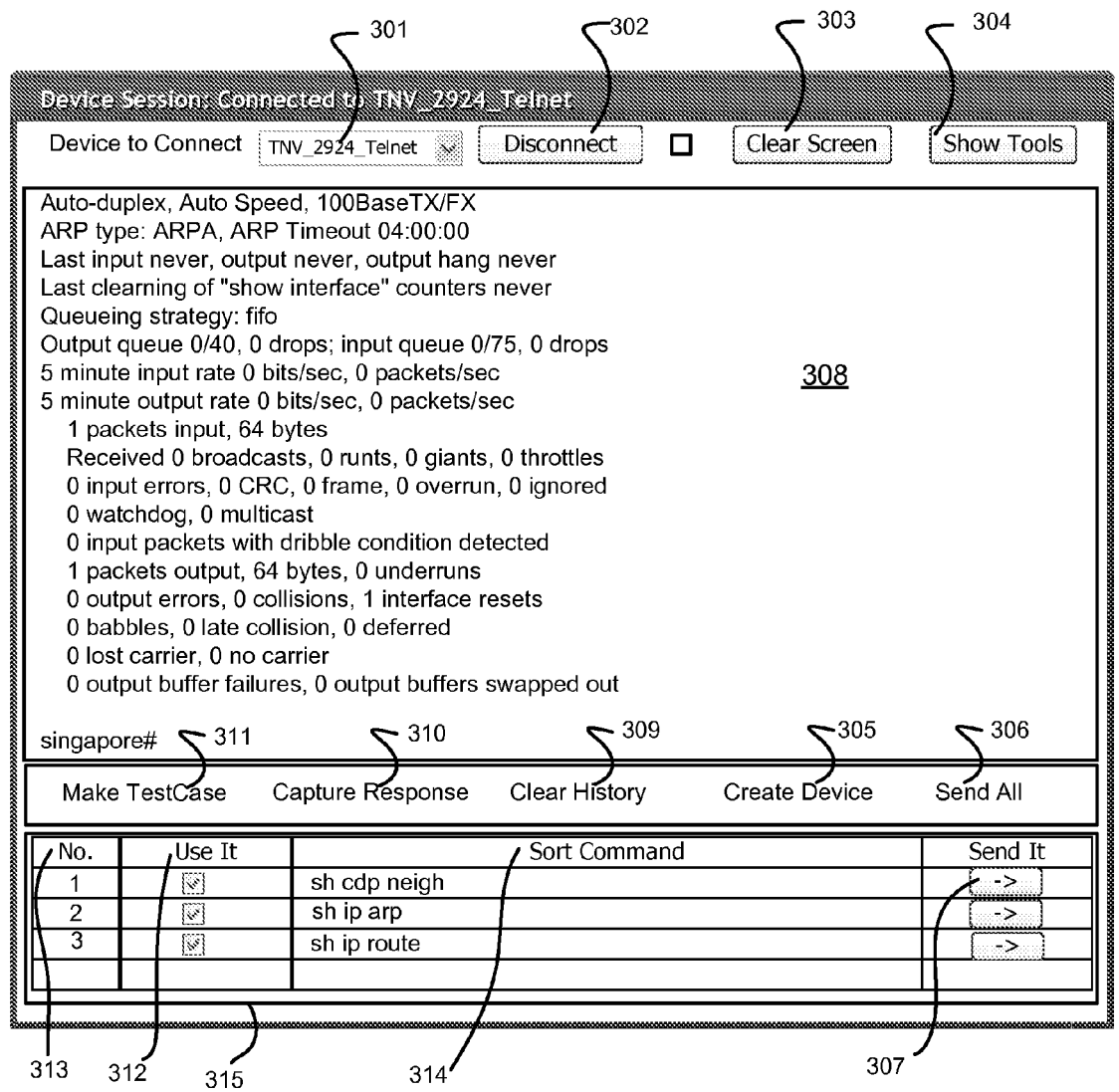
FIG. 3 shows an example of a user interface for a device session.

As illustrated in FIG. 3, the GUI includes a command terminal 308 where user can type commands and execute them against a connected device. The GUI also includes a panel 315 to show the command history. The history of commands entered by the user is maintained and stored in persistent storage medium.

All executed commands 314 are displayed to the user and the user may re-send the command to the connected device. One embodiment of this would be to select a send button which is visually associated with that command 307.

Standard command terminals also maintain command history. However, these standard command terminals do not display the command history in a graphical user interface list form so as it is readily visible to the user. Furthermore, while executing a sequence of commands on a standard command terminal, if such terminal crashes due to a fault in the command execution by the device, the command history is also lost, thereby, depriving user of the crucial information such as which command triggered the crash.

The history of commands is continuously saved in a persistent storage to prevent history loss in the event of unexpected crashes.

The GUI contains controls to show list available devices, connecting a device, clear screen, show tools, create test case, capture response of a command, to show command history and to re-send selected command or to resend all command as displayed in the command history.

The GUI may be implemented on any generally available operating systems using any generally available computer languages.

Executing Commands, Creating Device Libraries and Test Cases

Figure 1:
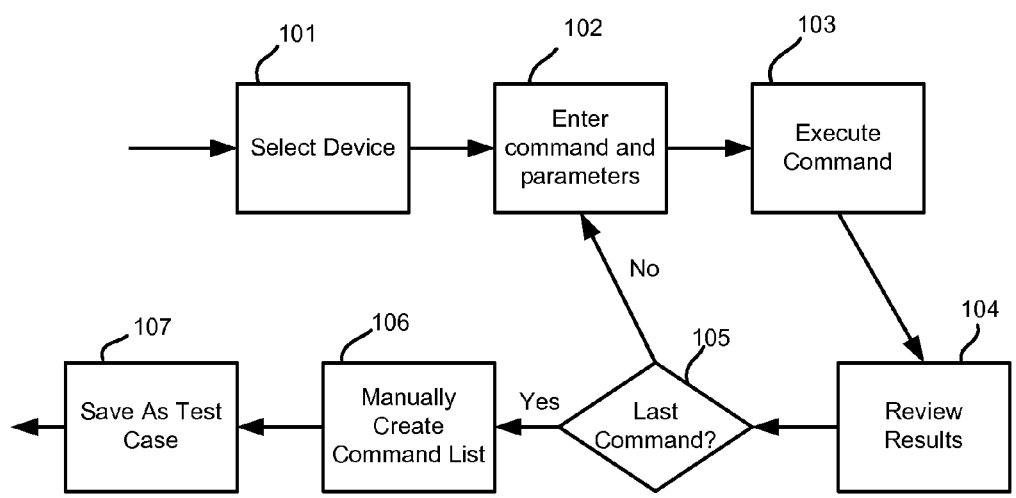
FIG. 1 illustrates the process of adding variables from test results into a test in the prior art.
Figure 2:
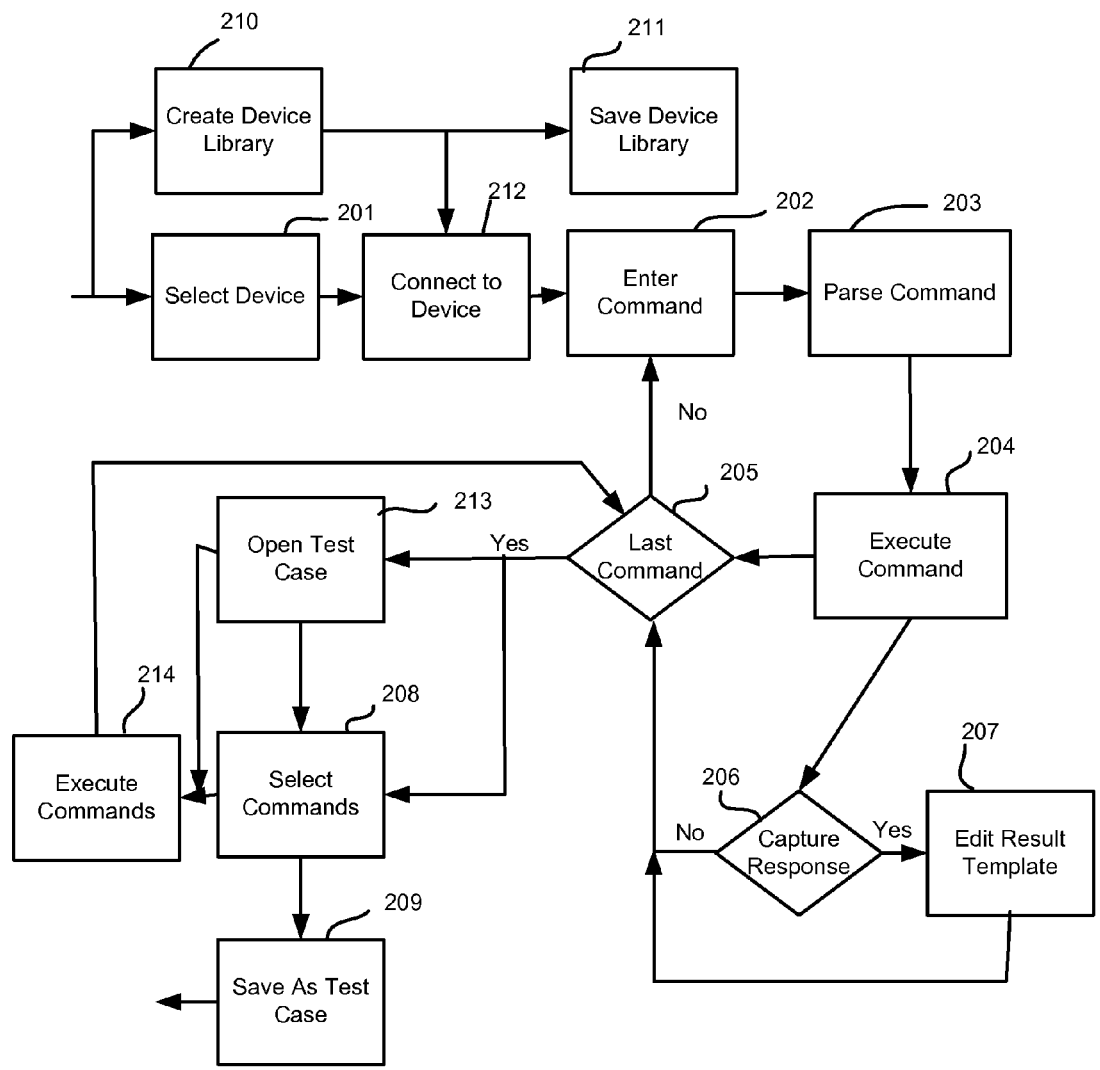
FIG. 2 illustrates the general process by which the apparatus is used to create device libraries, test cases, and associate them with test cases.

The process for creating the script is as shown in FIG. 2.

A user would start this process when there is a need to define a new or modify an existing test script, troubleshoot a device with an existing test script, or when defining a new device library.

Initially, the user may select from one or more of the existing device libraries 201. The device libraries are stored in persistent data storage such as database or file system. If a device library already exists for a similar device (i.e. same device, different address), the user may select the device library then initiate the create device menu function to display the device attributes and modify it. Once it has been modified it can be saved under the current device name or a new name.

If the user needs to create a new device library from scratch, the user would select the "Create Device" item from the display and see a dialog which would prompt the user for the device name, the protocol to use, the command shell to use, the address of the device, and the parsing algorithm to use 210. The device library will "learn" the prompts as it goes through the commands and save them to the device library. The system automatically detects and parses device parameters and prompts from the device response after initial connection to the device. Newly created device library is stored in a persistent storage such as database or file system. Preferred format of the device library can be text or xml. However, a person skilled in art would appreciate the device library could be stored in other formats (example: binary) too.

As soon as the device library has been selected, created or modified, the user can select the "connect" function to connect to a device and create a telnet-like session with the device. That is, a scrollable display showing the past and current commands and the displayed response. Based on the user selection in the definition of the device library, the telnet session could emulate some specific terminal interface.

The user may then enter a command 202. The command is entered using the edit controls associated with the current shell, including any continuation characters allowed for the shell. On hitting the return key without any continuation characters present at the end of the previous line, the command will be ready to send to the device.

Prior to sending the command to the device, the command is parsed using the parsing algorithm specified for the device 203. The algorithm is used to separate the command from its parameters and is dependent upon the shell being used. The command will then be stored in the history buffer and displayed to the user. One embodiment would be a regular expression parser to separate out the separator characters like spaces and commas from the command and parameter values.

Once the command has been successfully parsed, it will be put into a buffer and sent to the device address for execution 204. The response is displayed on the terminal session to the user. When the command response is complete, the device prompt is captured and, if different from any in the current device library added to the device library.

A data structure called the response buffer stores the previous response. If the user wishes to capture the response 206, she/he can create a response template to associate with the command, or associate an existing response template with the response 207. The response templates are retrieved from persistent data storage. If the prior command is then saved as part of a test case 209, the response template will be associated with it as well. The test case is stored in persistent data storage such as file system or database. The data file could be stored in any format such as text, xml, or binary. All associations such associations among device library, test case, response template, and login rules are persistently stored.

If this is the last command to enter 205, the user may choose to do several things. He may overwrite the current command buffer with a test case by replacing the history buffer with a test case 213. He may select a subset of the commands to execute 208, or may select a subset of the commands to save as a test case 209.

The user may select to replace the current history buffer with an existing test case 213. In one embodiment, this is done by dragging the test case from an explorer display to the active user display, and the address will be automatically changed to reflect the last entered device address.

The user may select to select a subset of commands to execute 208. This could be done for several reasons. First, the user may wish to verify a sequence to use as a test script. Second, the user may wish to modify the device library to point to a different device address in order to troubleshoot another device on the network. Once the sequence is executed 214, the user could capture the final response and associate it with the last command.

The user may select to save a subset of commands as a test case 209. The user will select the desired commands using a visual cue like a checkbox displayed along with each command, and then select the "save as test case" or similar option. The user will then be prompted for a name of the test case, and the test case will be saved as the set of commands, associated with the selected device library and result templates associated with the selected commands.

The user may also save the session as a named grouping of a device library, prompts, the executed commands and their associated response templates. This session in turn is associated with a grouping of sessions called a 'test bed'. Any session stored in the test bed can be either reanimated with that stored device or the device can be changed to any device known to the application before reanimating the session. At reanimation, the session is ready for connection to the selected device.

FIG. 3 shows an implementation of the primary user display. It is broken up into four regions; terminal session controls, terminal emulator, command history controls, and command history.

The terminal session controls are used to select session characteristics via a device library 301, connect or disconnect to the device 302, clear the display 303, and show tools 304.

The terminal emulator 308 allows users to process commands like one would in a terminal or telnet session. Unlike a terminal or telnet session, should the device cause a crash to occur the command history is preserved in the command history display, and may be replayed to reproduce the problem using the "send it" function 307.

The command history controls include functions to allow for the creation of test cases 311, capture response and associate a response template with the last command 310, clear history list 309, create or modify the currently selected device 305, and send a set of selected commands 306.

The create test case function 311 allows one to create a test case around the current device library and a subset of commands in the history buffer selected using the "use it" function associated with each command 312. The test case dialog is then displayed and the user enters the test case name and description.

The history buffer consists of the set of commands in the order they were sent. Each command has a sequence number associated with it, that is generated by the system 313. The "use it" visual cue determines if this command is used in a group function such as 'save as a test case' 311 or execute a group of commands 306. The sent command is simply a replica of the command sent to the device 314. The "Send It" function 307 allows the user to resend a command to the device, and treat it as if it were the last command sent, so that the command and its response appears in the terminal display, selecting the Capture Response function will allow you to build a response template for that response, etc.

In order to detect the completion of processing by the device the command processor must look for a string returned from the device known as a prompt. This prompt may vary from device to device, and may even vary depending on the command sent to the device.

Figure 4:
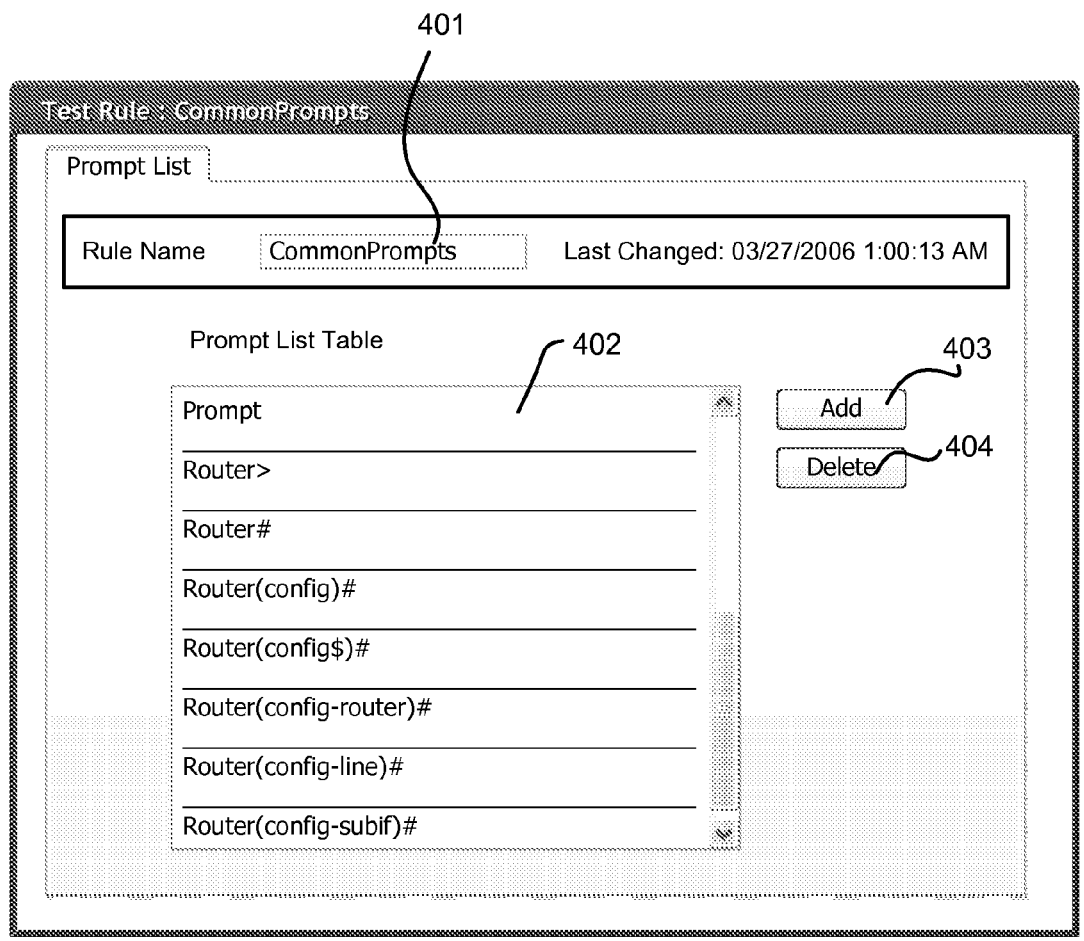
FIG. 4 shows an example of a user interface for maintaining the prompts
Figure 6:
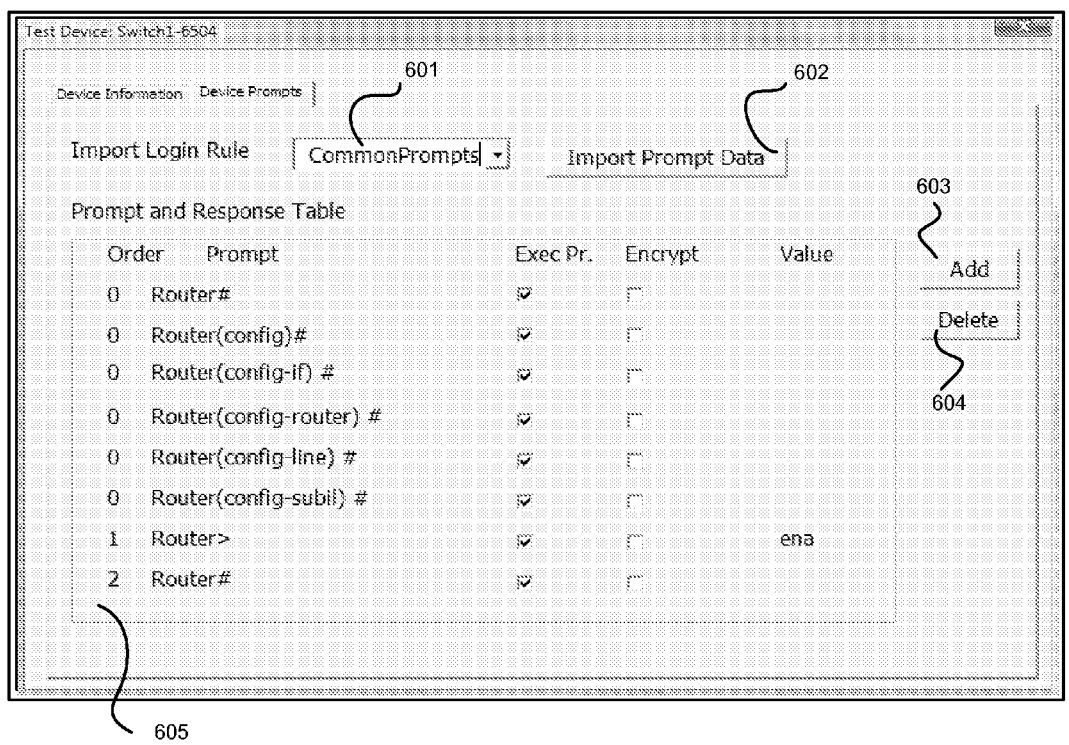
FIG. 6 shows an example of a user interface for creating and updating the prompts associated with a specific device.
Figure 7:
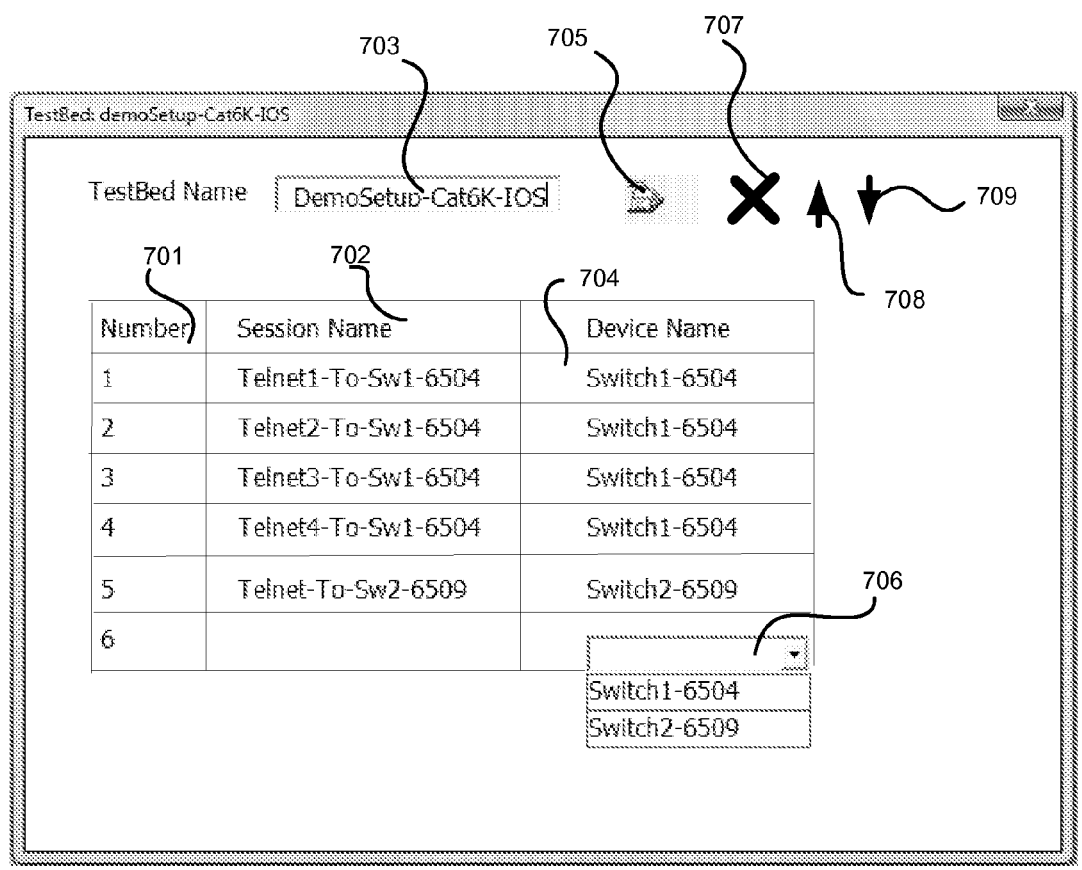
FIG. 7 shows an example of a user interface for maintaining the relationship between the user sessions and devices.

FIG. 4 shows a user interface for maintaining a list of common prompts. Prompts may be associated with a device through a user interface as shown in FIG. 6, or the session may learn what the prompts are by matching the response received from the device to the common prompt list. A user selects a rule name 401 to determine how to capture prompts in real time. Then may edit the list of rules 402 by adding new prompts 403 or selecting a prompt and deleting it from the list 404.

Figure 5:
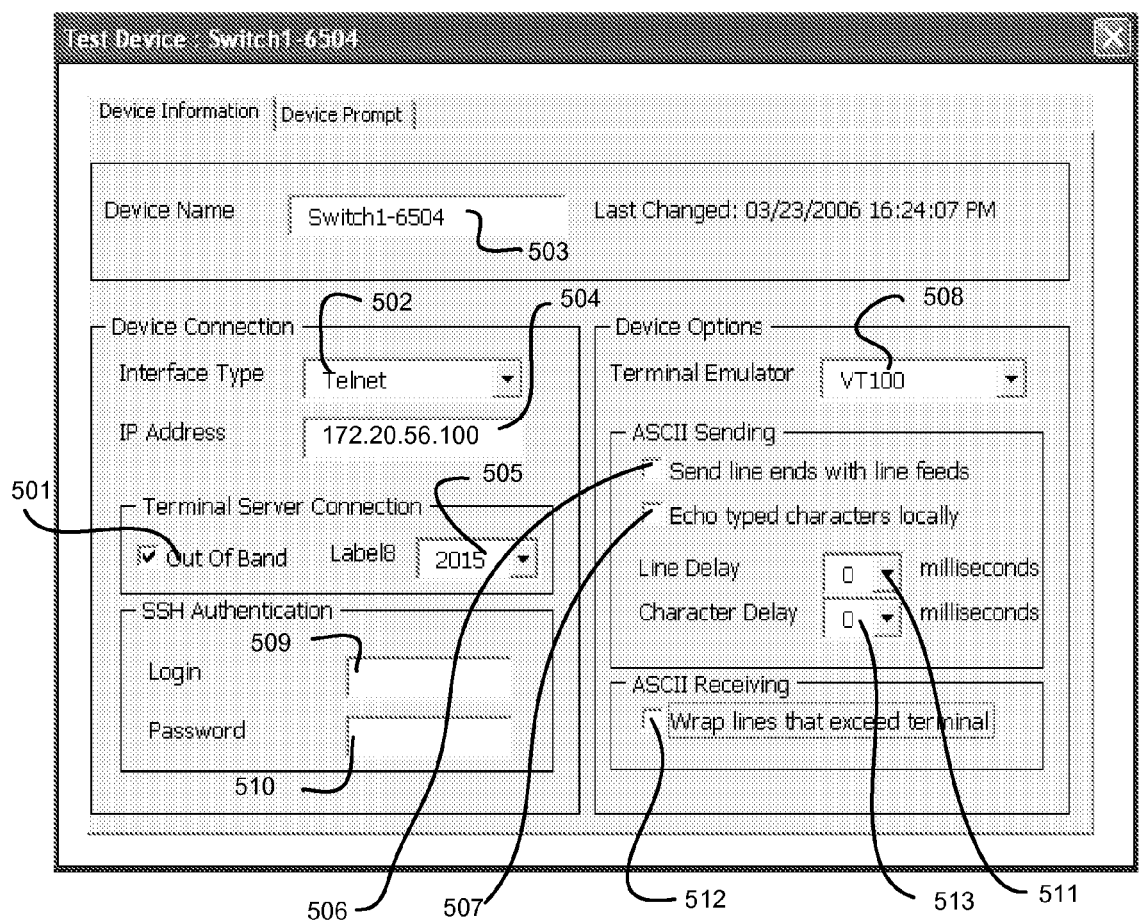
FIG. 5 shows an example of a user interface for creating or updating the device connection parameters.

In order to connect and interact with a device, the connection protocol must be defined and optionally, the expected prompts are entered. FIG. 5 shows a user interface for connecting to a device. FIG. 6 shows the mapping of prompts to the device.

In FIG. 5, the device name is entered 503. If the device has already been created, it cannot be changed. The interface type 502 determines what other information might be needed. For instance, if the connection is via a secure protocol, then login username 509 and password 510 would be enabled. Every device will require an IP address 504 and port number 505. If the out-of-band check box is checked 501, it is assumed that the access to the device will be through a terminal server. The user may also describe the type of terminal emulation desired 508 along with characteristics of the terminal that should be supported in the session 506, 507, 508, 511, 512, 513.

The prompts to be used are shown in FIG. 6. The prompts are selected by selecting the Import Login Rule type from the list 601, then click on the import prompt data button 602. The processor then gets the prompts currently associated with that rule and fills in the prompt list 605. One can modify the list by adding new prompts by clicking on add button 603, or selecting prompts from the list and deleting them by clicking on delete button 604.

Once a session has been completed, it may be saved by giving it a name, and associate it with a grouping called a Test Bed. Later, it can retrieved by selecting the row 701, modify the device if desired 706, and start it by clicking the start button 705. From this interface, one may maintain the list by selecting rows and deleting them 707, or scrolling up 708 or down 709 the list.

Figure 8:
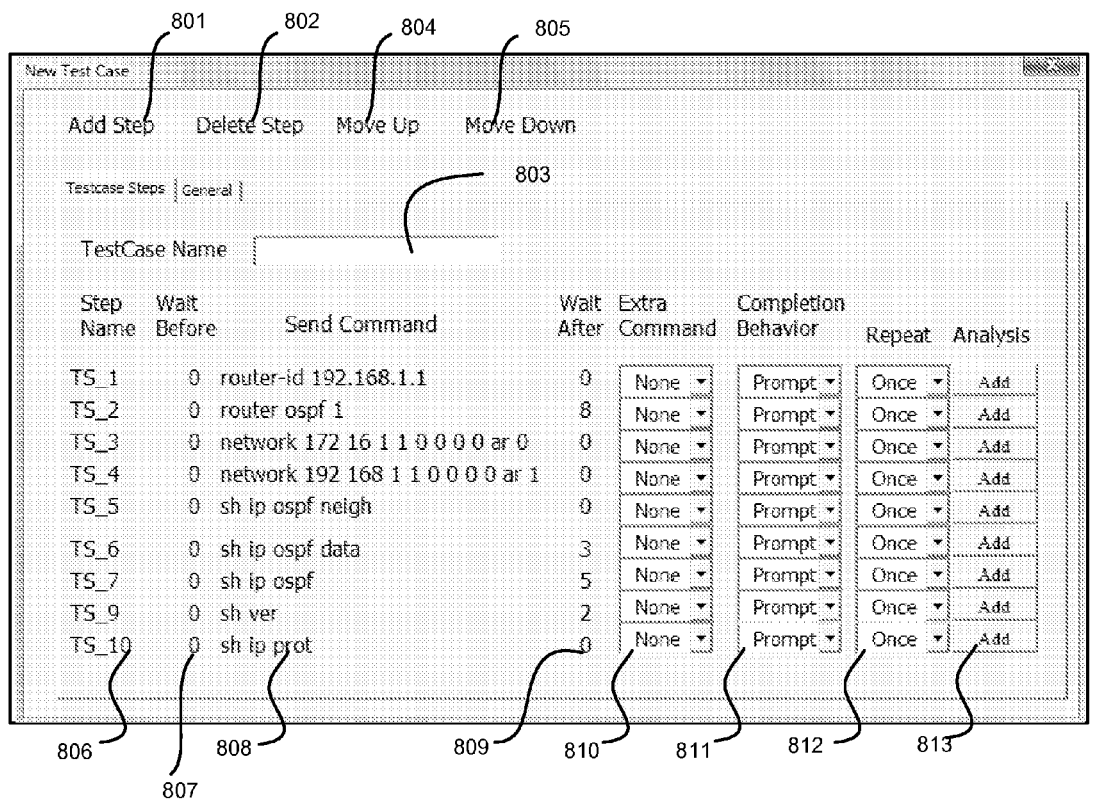
FIG. 8 shows an example of a user interface for creating a test case from a user session.

If one selects a group of commands and opts to create a test case from their session 313 as shown in FIG. 3, a user interface as in FIG. 8 is displayed to prompt the user. The steps are automatically numbered 806, though one can change the order by selecting a step and moving it up 804, down 805, or even deleting it altogether 803. One can also add a step 801 and is then prompted for the information contained in a step, as shown in the table 807, 808, 809, 810, 811, 812, 813.

The user interface shown in FIG. 8 provides for manual editing of the automatically generated test case. The wait before 807 and after 809 are based on the information automatically captured while processing the commands; as such the wait before defaults to none or user may configure any predefined wait before a particular command in the test case executes.

Some commands require further user interaction before they are actually executed by the device. For example, a device may require confirmation Yes or No before executing the command. Extra command 810 allows providing a preset answer to such query from the device.

Completion behavior 811 describes to the test case what behavior triggers notice of completion of the command. Default is prompt as defined in the login rules of the device under test. However, it can be changed for a particular command in the test case by selecting a different prompt. If a different prompt is selected in Completion Behavior 811, this different prompt is used by the test case to determine when the command execution ends.

Alternatively, a timeout value can be selected in Completion Behavior 811 for a particular command in the test case. If a timeout is selected, no prompt is expected when the command execution ends, rather the system waits for the duration of selected timeout and moves on to the next command execution in the test case. If none is selected, the system executes next command immediately after finishing the command.

Repeat 812 allows creating execution loops. Some commands send Pass or Fail results at the end of the command execution. In repeat dropdown 812, number of iteration for the command execution can be selected (example: once, twice . . . ). Alternatively, it may be configured to run the command until pass results is received, or failed result is received. Furthermore, alternatively a timeout value may also be selected; in that case the command will continue being repeated for the duration of that timeout value.

Analysis 813 allows one to insert a result template to associate with this step, if one isn't associated already.

What is claimed is:

1. A method for creating a test case for a device under test (DUT) through a command terminal, the method comprising:
   (a) selecting the DUT in the command terminal, wherein the selecting includes retrieving connection parameters for the DUT;
   (b) connecting to the DUT using the connection parameters;
   (c) enabling input of a text string in the command terminal, wherein the text string includes a command;
   (d) storing the text string in a history buffer, the history buffer storing previously executed commands;
   (e) displaying the text string in a command history panel of the command terminal, the command history panel displays content of the history buffer;
   (f) sending the text string to the DUT;
   (g) displaying a response from the DUT in the command terminal;

(h) enabling a user to select and unselect a text string in the command history panel; and (i) storing the selected content of the history buffer in a data file that represents the test case, wherein the unselected content not being stored in the test case, wherein the command terminal including a command emulator panel to facilitate entry of the text string and to display a response of the DUT to the text string.

2. The method for creating the test case as recited in claim 1, wherein the text string further comprising at least one command parameter.

3. The method for creating said test case as recited in claim 2 further comprising detecting a prompt in a command-response from the DUT.

4. The method for creating the test case as recited in claim 2 wherein the sending further comprising capturing a value of the command parameter.

5. The method for creating said test case as recited in claim 1 further comprising storing the command in a command execution history buffer.

6. The method for creating said test case as recited in claim 1 wherein the connecting further comprising capturing values of the connection parameters.

7. The method for creating the test case as recited in claim 1 wherein the storing further comprising associating the data file with the DUT.

8. The method as recited in claim 1, wherein steps (a) to (i) are executed sequentially in listed sequence.

9. The Method as recited in claim 1, wherein steps (d) and (e) are executed after step (g).

10. An apparatus for creating a test case for a device under test (DUT), comprising:
    a command terminal to display a command response of the DUT;
    a command history panel to display a command execution history, wherein the command execution history includes a plurality of previously executed commands, the command history panel including a user interface to display each of the plurality of previously executed commands, the user interface includes a re-execute control associated with the each of the plurality of previously executed commands to enable a re-execution of each of the plurality of previously executed commands; and
    a connection control to establish a connection to the DUT.

11. The apparatus for creating a test case as recited in claim 10, wherein the command history panel further comprising a selection control to select or unselect the command, wherein only selected commands in the command history panel are included in the test case when the command execution history is saved.

12. The apparatus for creating a test case as recited in claim 10 further comprising a save file control to store in a data file selected ones of the plurality of previously executed commands.

13. The apparatus for creating a test case as recited in claim 10 further comprising a prompt management user interface to manage prompts in a prompt data store.

14. The apparatus for creating a test case as recited in claim 13, wherein the prompt management user interface further comprising a control to add a prompt to the prompt data store.

15. The apparatus for creating a test case as recited in claim 14, wherein the prompt management user interface further comprising a control to delete the prompt from the prompt data store.

16. The apparatus for creating a test case as recited in claim 10 further comprising a device information user interface to manage device parameters, device parameters including interface type and IP address of the DUT.

17. A method of managing a test case for a device under test (DUT) comprising:
    separating the test case in a plurality of execution steps wherein, each execution step in the plurality of execution steps is associated with a command;
    assigning a completion behavior to each execution step in the plurality of execution steps, wherein the completion behavior includes determining completion of each execution step, wherein determining the completion of each execution step includes detecting at least one of a particular string in a device response of the each execution step and a time out, the particular string being defined in login rules for the DUT; and
    assigning an extra command to each execution step in the plurality of execution steps, wherein the extra command includes a preset answer to a command query.

18. The method of managing a test case as recited in claim 17, further comprising assigning a repeat behavior to each execution step in the plurality of execution steps, wherein the repeat behavior includes specifying a number of executions of the execution step.

19. The method of managing a test case as recited in claim 17, further comprising assigning a wait period for the execution step to wait before starting execution.

* * * * *